US009488758B2

(12) United States Patent
Hirsa

(10) Patent No.: US 9,488,758 B2
(45) Date of Patent: *Nov. 8, 2016

(54) LIQUID LENS WITH MAGNIFICATION CONTROL

(71) Applicant: RENSSELAER POLYTECHNIC INSTITUTE, Troy, NY (US)

(72) Inventor: Amir H. Hirsa, Clifton Park, NY (US)

(73) Assignee: RENSSELAER POLYTECHNIC INSTITUTE, Troy, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/443,086

(22) PCT Filed: Nov. 13, 2013

(86) PCT No.: PCT/US2013/069800
§ 371 (c)(1),
(2) Date: May 15, 2015

(87) PCT Pub. No.: WO2014/078354
PCT Pub. Date: May 22, 2014

(65) Prior Publication Data
US 2015/0331156 A1    Nov. 19, 2015

Related U.S. Application Data

(60) Provisional application No. 61/727,265, filed on Nov. 16, 2012.

(51) Int. Cl.
*G02B 3/14* (2006.01)
*G02B 26/00* (2006.01)

(52) U.S. Cl.
CPC .............. *G02B 3/14* (2013.01); *G02B 26/004* (2013.01); *Y10T 29/49886* (2015.01)

(58) Field of Classification Search
CPC ..... G02B 3/12; G02B 3/14; G02B 2207/115
USPC ................................. 359/665, 666
See application file for complete search history.

(56) References Cited

U.S. PATENT DOCUMENTS 5,886,332 A * 3/1999 Plesko ............... G02B 3/14
235/462.35
8,564,884 B2 10/2013 Hirsa et al.
(Continued)

FOREIGN PATENT DOCUMENTS

JP   2011248148 A   12/2011
KR   1020080014278 A   2/2008
KR   1020090084425 A   8/2009

OTHER PUBLICATIONS

International Search Report for PCT/US2013/069800 dated Feb. 25, 2014.

*Primary Examiner* — Darryl J Collins
(74) *Attorney, Agent, or Firm* — Kevin P. Radigan, Esq.; Heslin Rothenberg Farley & Mesiti P.C.

(57) ABSTRACT

A liquid lens structure and method of fabrication are provided. The liquid lens includes a substrate with a channel opening extending through the substrate. A liquid drop is disposed within the channel and an enclosure at least partially surrounds the substrate, and forms a chamber. The liquid drop resides within the chamber, and a second liquid is disposed within the chamber in direct or indirect contact with the liquid drop at a first interface and a second interface. The first and second interfaces define first and second protruding liquid portions relative to the first and second surfaces, respectively. Taken together, the first and second liquid portions define a total protruding liquid volume. A lens magnification control is provided for adjusting magnification of the liquid lens by increasing or decreasing the total protruding liquid volume defined relative to the first and second surfaces.

17 Claims, 11 Drawing Sheets

(56) References Cited

U.S. PATENT DOCUMENTS

| | | |
|---|---|---|
| 8,729,515 B2 | 5/2014 | Hirsa et al. |
| 2009/0086331 A1 | 4/2009 | Gunasekaran et al. |
| 2009/0316003 A1 | 12/2009 | Hirsa et al. |
| 2011/0096406 A1 | 4/2011 | Kaiper |
| 2011/0222163 A1* | 9/2011 | Hirabayashi ............ G02B 3/14 359/666 |
| 2013/0057963 A1* | 3/2013 | Ono ........................ G02B 3/14 359/665 |

* cited by examiner

LIQUID LENS WITH MAGNIFICATION CONTROL

CROSS-REFERENCE TO RELATED APPLICATIONS

This application is a national stage filing under section 371 of International Application No. PCT/US2013/069800 A1. In addition, this application claims the benefit of U.S. Provisional Patent Application No. 61/727,265, filed Nov. 16, 2012, which is hereby incorporated herein by reference in its entirety. In addition, this application is related to U.S. patent application Ser. No. 13/190,980, filed Jul. 26, 2011, entitled "Pinned-Contact, Oscillating Liquid-Liquid Lens and Imaging Systems", published Feb. 2, 2012, and U.S. Pat. No. 8,564,882, issued Oct. 23, 2013, entitled "Reconfigurable, Non-Oscillating Liquid Lens and Imaging Systems". All of the above-noted applications are hereby incorporated herein by reference in their entirety.

BACKGROUND

The present invention relates in general to adaptive optical devices, and more particularly, to liquid lenses, and to imaging systems and imaging methods employing the same.

Optical focusing is often a slow process due to the delay inherent in moving mechanically a camera's lens until an image is in focus. Although liquids are considered an exotic choice for lens material, there is interest in liquid lenses for applications in adaptive optics requiring fast response, or for applications that require small or cost effective optics. Liquid lenses advantageously avoid the increased weight and fabrication complexity associated with moving solid lenses. The interface of a liquid lens has good optical qualities because of surface tension, which dominates gravity in the sub-milliliter scale, and provides interfaces that are nearly perfectly spherical and optically smooth down to molecular scales.

The recent surge in the use of images and multimedia in consumer-level wireless communications has fueled the pursuit of lightweight and robust adaptive optics. The desire for such lenses extends beyond cell phones and camcorders, however, to advanced technologies in biomedical sensing and imaging, autonomous air and underwater vehicles for surveillance and defense, microscopy and adaptive lithography for micro-manufacturing, etc.

BRIEF SUMMARY

The shortcomings of the prior art are overcome and additional advantages are provided through the provision, in one aspect, of an apparatus comprising a liquid lens. The liquid lens includes a substrate comprising at least one channel extending through the substrate between a first surface and a second surface of the substrate, and a liquid drop comprising a first liquid. The liquid drop is disposed, in part, within one channel of the at least one channel extending through the substrate, and the liquid lens further includes an enclosure which at least partially surrounds the substrate, and which includes a chamber. The one channel of the at least one channel extending through the substrate resides within the chamber of the enclosure. A second liquid is disposed within the chamber, and the second liquid and the liquid drop comprising the first liquid are either in direct or indirect contact within the chamber at a first interface and a second interface. The first interface defines a first protruding liquid portion relative to the first surface of the substrate, and the second interface defines a second protruding liquid portion relative to the second surface of the substrate, and taken together, the first and second protruding liquid portions define a total protruding liquid volume. A lens magnification control is provided for adjusting magnification of the liquid lens by controllably increasing or decreasing the total protruding liquid volume defined relative to the first and second surfaces of the substrate.

In another aspect, a method of fabricating a liquid lens is provided, which includes: obtaining a substrate, the substrate being non-wetting relative to a liquid drop; providing at least one channel in the substrate extending from a first surface to a second surface thereof; providing the liquid drop, comprising a first liquid, within one channel of the at least one channel extending through the substrate; providing an enclosure at least partially surrounding the substrate and comprising a chamber, the one channel of the at least one channel extending through the substrate residing within the chamber of the enclosure; disposing a second liquid within the chamber, the second liquid and the liquid drop comprising the first liquid being in one of direct or indirect contact within the chamber at a first interface and a second interface, the first interface defining a first protruding liquid portion relative to the first surface of the substrate, and a second interface defining a second protruding liquid portion relative to the second surface of the substrate, and taken together, the first and second protruding liquid portions defining a total protruding liquid volume; and providing a lens magnification control for adjusting magnification of the liquid lens by controllably increasing or decreasing the total protruding liquid volume defined relative to the first and second surfaces of the substrate.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
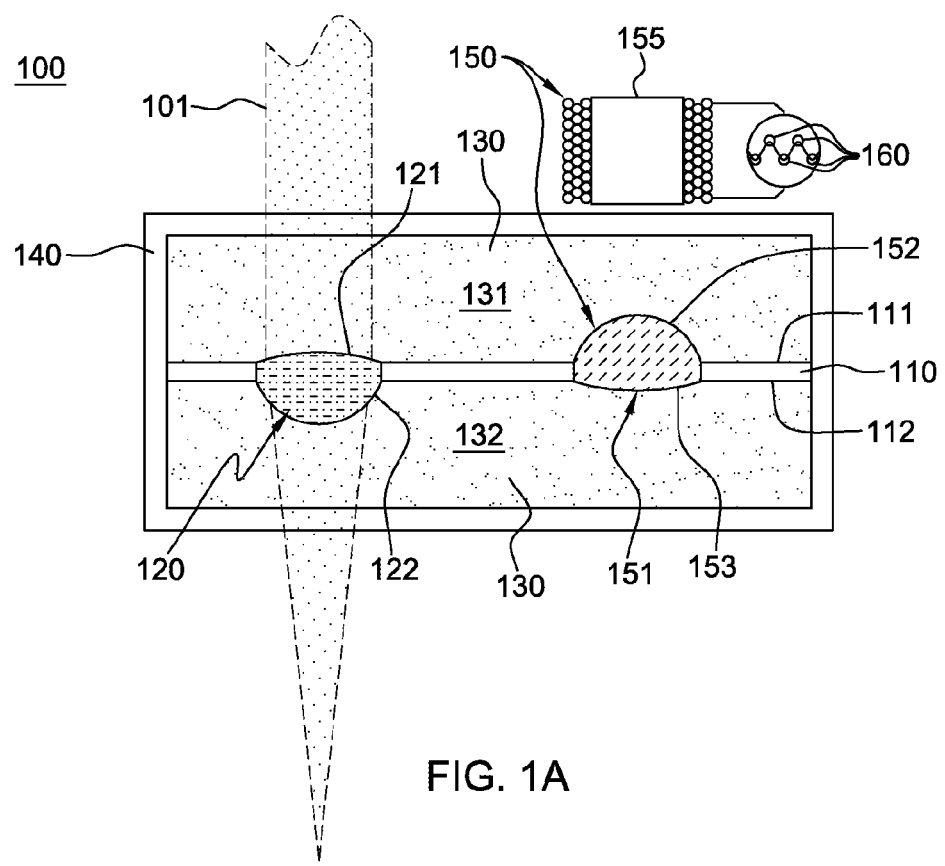
FIGS. 1A & 1B depict one embodiment of an apparatus comprising an oscillating liquid lens, wherein operational movement of a liquid drop of the lens, responsive to an actuator, is shown with a second droplet portion protruding away from a second surface of the substrate (enlarged in FIG. 1A), and a first droplet portion protruding away from a first surface of the substrate (enlarged in FIG. 1B), in accordance with one or more aspects of the present invention.

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Disclosed herein, in one aspect, is a significantly faster focusing paradigm, wherein instead of moving a lens to a final position, the shape of the lens described is continuously oscillated, and thus its focal distance is continuously oscillated. In a period of oscillation, the focal distance evolves through its full range of values, and a synchronized, high-speed sensor is employed to capture sharp images at different focal points. Focusing in the range of 0.01 seconds has been experimentally achieved, which was less than the period of oscillation. This was achieved by vibrating the system at its resonance frequency using a small (e.g., millimeter-size) liquid lens. In combination with the oscillating liquid lens, a lens magnification control is also advantageously presented.

More particularly, in one aspect, described herein by way of example is a liquid-liquid lens with an oscillating focal distance, which can capture any image plane in a given range by grabbing the image "in synch" with the oscillations. By oscillating the lens, the task of changing the focal distance is effectively transformed from a mechanical manipulation to an electronic timing of image capture, which can be achieved significantly more quickly. High-fidelity imaging has been demonstrated at 100 Hz for a milliliter-scale liquid lens, driven at resonance and featuring pinned-contact lines. Significantly faster responses may be possible with scaled-down lenses.

While certain strategies have used membranes to contain a liquid lens, of particular interest is a liquid lens constrained only by the surface tension itself, primarily due to the deleterious effects of the membrane on image quality and the manufacturing challenges in producing a uniform and long-lasting membrane. However, even surface-tension-bound strategies have been awkward in practice, with gravity limiting apertures to a few millimeters and evaporation preventing stable operation beyond a few minutes.

Addressing these issues, disclosed herein are liquid-liquid lens structures and imaging systems and methods employing the same, which mitigate the shortcomings of previous liquid lenses by achieving stable operation at least as high as 30 Hz, centimeter-scale apertures, orientation independence, and long-term stability. The liquid-liquid lens is formed by coupling two droplets of a first, high-index of refraction liquid through a first channel (for example, a circular hole) in a substrate, such as a plate, and providing a second liquid, such as water, surrounding the plate and liquid lens, with the lens system being enclosed by an enclosure (such as a transparent acrylic box). By matching density of the first liquid droplets ($\rho_D$) with that of the surrounding liquid, such as water ($\rho_W$), the capillary length (scales with $(\rho_D-\rho_W)^{-1/2}$) can be increased from millimeters (for a typical liquid in gas liquid lens, such as a water lens in air) to centimeters.

To effect change in the curvature of the droplet (to achieve a focal distance change) it is desirable to actuate the enclosed lens system in a non-invasive manner. To this end, one or more second channels (or openings) are provided in the substrate, each of which accommodates two connected droplets of an immiscible ferrofluid. With a relatively small electromagnetic driver placed outside of the enclosure, the ferrofluid drop(s) can function as "liquid piston," displacing the first liquid drop (i.e., the liquid lens) as the ferrofluid droplets move within the fixed volumes of first and second chamber portions on either side of the substrate. An oscillating voltage signal (e.g., 3 volts in amplitude) can be provided to the electromagnetic driver (such as a 150-turn electromagnet with an iron core) to produce an oscillating magnetic field, which in turn produces oscillatory motion of the ferrofluid drop(s), and consequently the liquid drop (that is, the liquid lens). For simplicity, in one embodiment, a single electromagnet may be used to perturb a single ferrofluid drop (comprising two coupled ferrofluid droplets), with capillarity (i.e., spring-like) action being the restoring force.

Figure 1B:
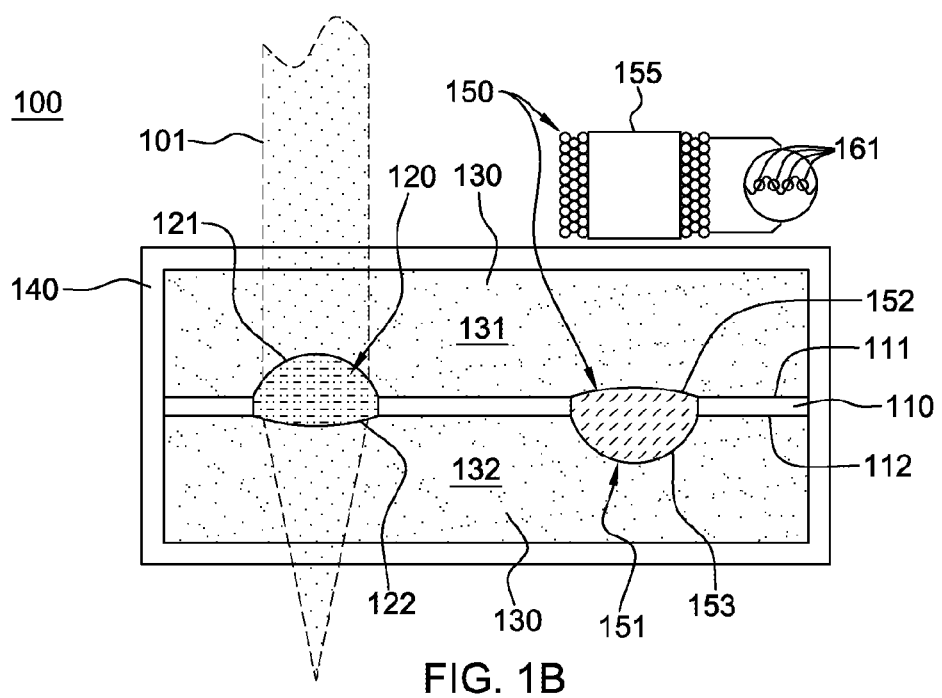

By way of example, FIGS. 1A & 1B illustrate one embodiment of a liquid lens structure, generally denoted 100, in accordance with one or more aspects of the present invention. As shown, liquid lens structure 100, which is alternatively referred to herein as a liquid-liquid lens structure, or simply a liquid lens, includes a substrate 110 having opposite first and second main surfaces 111, 112, respectively. Substrate 110 is non-wetting in relation to the lens and driver liquids, in the presence of a surrounding liquid such as water, and comprises, in one example, a hydrophobic material, such as anodized aluminum. The substrate 110 may itself be formed of such a non-wetting material, or be coated with the non-wetting material, but not necessarily within the one or more channels (or openings) described herein. In the depicted example, substrate 110 includes first and second channels extending therethrough between first main surface 111 and second surface 112. These first and second channels are depicted by way of example only. In other implementations, an array of multiple channels may be provided for either the liquid lens portion or the driver portion of the liquid-liquid lens system described herein. For example, in other implementations, multiple channels may be provided for either or both the liquid lens portion or the driver portion of the structure, each with a common transverse cross-sectional area (e.g., a common diameter), or with different transverse cross-sectional areas (e.g., different diameters), as desired. By providing channels with different cross-sectional areas, or different amounts of liquid protruding from channels of the same cross-sectional area, an array of coupled droplets may achieve, for instance, different focusing characteristics or different drive characteristics.

Within the first channel of substrate 110, a liquid drop 120 is disposed. By way of example, each channel to accommodate a liquid drop (to function as the lens portion of the liquid lens system) may comprise a cylindrical-shaped hole (or bore) through the substrate, with each liquid drop being a drop of transparent liquid such as, for example, silicone oil. Those skilled in the art will note, however, that other liquids may alternatively be employed as the liquid lens. Because substrate 110 is non-wetting, the liquid drop 120 does not spread on the substrate, and the liquid-liquid-solid contact line between liquid drop 120, a second liquid 130 (e.g., water) within a chamber defined by an enclosure 140 (described below) and substrate 110 is pinned at the edge of the first channel. Liquid drop 120 may be characterized as including a first droplet portion 121 comprising a first capillary surface which protrudes away from first surface 111 of substrate 110, and a second droplet portion 202 (FIGS. 2A & 2B) comprising a second capillary surface which protrudes away from second surface 112 of substrate 110. In this embodiment, the liquid drop and the second liquid are in direct contact and are immiscible, with the first and second capillary surfaces of liquid drop 120 being liquid-to-liquid interface surfaces of the liquid-liquid lens disclosed herein, which as noted above, are nearly perfect, spherical shapes, due to surface tension. The first and second droplet portions 121, 122 of liquid drop 120 are directly connected (i.e., interconnected) through a liquid body portion of liquid drop 120 disposed within the first channel of substrate 110 holding the liquid drop.

The opposing curvatures of the droplet portions create a spring-like force that makes the liquid drop 120 a natural oscillator as force acts on its mass. In accordance with an aspect of the present invention, it can be demonstrated that for a range of parameters, the liquid drop 120 can be driven harmonically, such that the shapes of the droplet portions 121, 122 are essentially spherical and hence suitable for optics. Also, forcing the liquid lens at system resonance allows the oscillatory motion to be sustainable with very little energy input. Dissipation associated with moving contact lines, viscous or otherwise, is minimized by pinning the contact lines using the non-wetting substrate. Furthermore, the oscillations are made to occur at time- and length-scales where capillarity balances inertia, as opposed to viscosity. The natural frequency of the liquid lens scales with the radius of the lens as $R^{-3/2}$, and, as a result, a very-high-frequency response can be obtained with a modest size lens.

As noted, the illustrated liquid-liquid lens structure 100 of FIGS. 1A & 1B further includes enclosure 140, second liquid 130 disposed within a chamber defined by enclosure 140, and a driver 150. In one embodiment, the chamber comprises a first chamber portion 131 and a second chamber portion 132, each of which is substantially filled with second liquid 130. Further, in one embodiment, enclosure 140 includes a bottom wall, two front and back walls, two side walls, and a top (or lid), which may be removable to allow access to the interior of the enclosure. By way of example, enclosure 140 may be a transparent housing, with the side walls being configured with a ledge to support and hold the substrate within the enclosure.

In one embodiment, driver 150 is configured to non-invasively, indirectly oscillate liquid drop 120 between first chamber portion 131 and second chamber portion 132. As one example, driver 150 may comprise a ferrofluid drop 151 disposed within the second channel extending between first main surface 111 and second main surface 112 of substrate 110, and an electromagnetic driver 155. By way of example, ferrofluid drop 151 may be characterized as including a first droplet portion 152 comprising a first capillary surface which protrudes away from first surface 111 of substrate 110, and a second droplet portion 153 comprising a second capillary surface which protrudes away from second surface 112 of substrate 110. First and second capillary surfaces of ferrofluid drop 151 are liquid-liquid interface surfaces in the liquid-liquid lens structure disclosed. The first and second droplet portions 152, 153 are directly connected (i.e., interconnected) through a liquid body portion of ferrofluid drop 151 disposed within the second channel through substrate 110.

The electromagnetic driver 155, such as a 150-turn electromagnet with an iron core, produces (in one embodiment) an oscillating magnetic field, which in turn produces oscillatory motion of ferrofluid drop 151, and consequently (via incompressible second liquid 130), oscillatory motion of liquid drop 120 (i.e., the liquid lens). As with liquid lens drop 120, the opposing curvatures of ferrofluid drop 151 create a spring-like force that makes ferrofluid drop 151 a natural oscillator, as force acts on its mass. Ferrofluid drop 151 functions as a "liquid piston," alternately displacing second liquid 130 within first chamber portion 131 and second chamber portion 132 as the ferrofluid drop oscillates, thus driving the liquid lens drop 120. In the illustrated embodiment, a single electromagnetic driver 155 is employed (by way of example) to perturb a single ferrofluid drop 151, with capillarity action being the restoring force. As explained herein, however, multiple electromagnetic drivers may be employed to more positively control oscillation of ferrofluid drop 151. In addition, in other implementations, multiple second channels may be provided, with common transverse cross-sectional areas (e.g., a common diameter), or different transverse cross-sectional areas (e.g., different diameters). By providing multiple second channels with different cross-sectional areas, or different amounts of ferrofluid drops protruding from the channels, different drive characteristics for the liquid lens system may be achieved.

Those skilled in the art will note from the description provided herein that, in this first aspect, the shape of liquid drop 120, and in particular, the upper and lower interfaces of the liquid drop, are continuous or intermittently altered with continuous or intermittent oscillation of ferrofluid drop 151 through the incompressible motion of the surrounding second liquid 130, thus producing an adaptive liquid lens that may be used to focus incident light 101. For instance, referring to FIGS. 1A & 1B, in operation, when electromagnetic drive 155 is in a magnetizing state 160, illustrated in the oscillatory signal applied to electromagnetic drive 155, first droplet portion 152 of ferrofluid drop 151 has a larger volume within first chamber portion 131 of enclosure 140 (as illustrated in FIG. 1A), and when the drive signal is deactivated 161 (FIG. 1B), inertia and surface tension cause the second droplet portion 153 of ferrofluid drop 151 to become larger within second chamber portion 132, as illustrated in FIG. 1B. When the electromagnetic drive is activated to operate on ferrofluid drive 151 to the extent illustrated in FIG. 1A, the incompressible second liquid 130 operates to force more of the first liquid in liquid drop 120 into second droplet portion 122 extending within second chamber portion 132 of enclosure 140. This in turn produces a longer focal distance in focusing incident light 101. In the opposite condition, where most of the first liquid is in the first droplet portion 121 in the first chamber portion 131 of enclosure 140, a shorter focal distance is achieved, as illustrated in FIG. 1B. In this manner, the focal distance of liquid drop 120 continuously varies as the ferrofluid drop oscillates, which in turn varies the refraction of the incident light 101, and thereby the focal point, providing an adaptive focal distance capability in the liquid lens.

Figure 2:
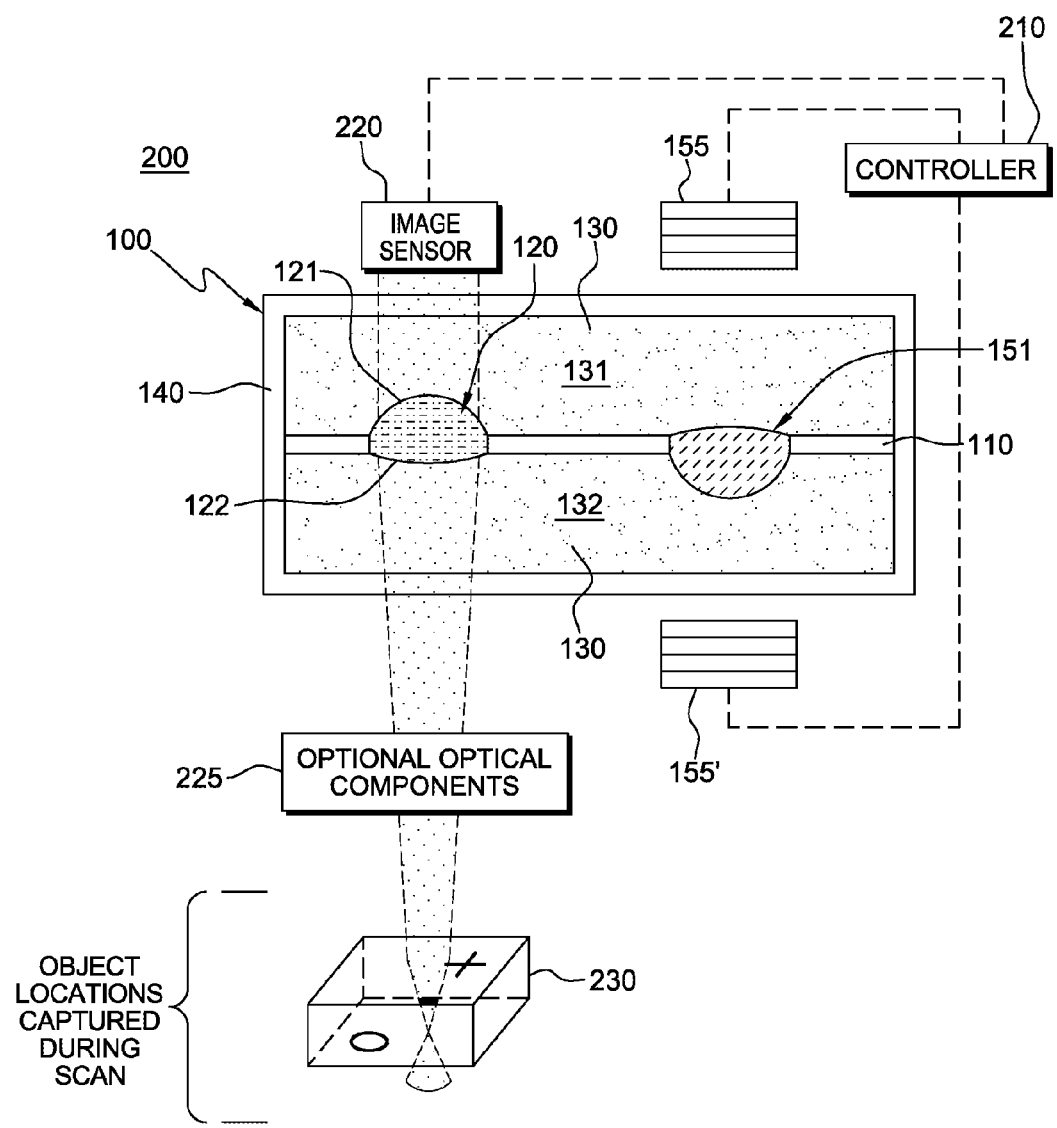
FIG. 2 is a schematic of one embodiment of an apparatus comprising an imaging system employing an oscillating liquid-liquid lens and illustrating imaging of an object in focus, in accordance with one or more aspects of the present invention.

The liquid-liquid lens structures disclosed herein may be incorporated and employed within various imaging systems. FIG. 2 depicts one embodiment of an imaging system, generally denoted 200, employing an oscillating liquid-liquid lens structure 100, such as described above in connection with FIGS. 1A-1B. As noted, liquid-liquid lens structure 100 includes a substrate 110 comprising at least one first channel through the substrate containing at least one liquid drop 120, which functions as the liquid lens, and at least one second channel containing at least one ferrofluid drop 151, which facilitates driving the liquid lens, as described herein. The liquid-liquid lens structure further includes an enclosure 140 defining a sealed chamber comprising a first chamber portion 131 and a second chamber portion 132 on opposite sides of the substrate, both of which are filled with a second liquid, such as water. The substrate is non-wetting and liquid drop 120 and ferrofluid drop 151 are pinned at the edges of their respective channels through substrate 110.

In the example of FIG. 2, imaging system 200 further includes a controller 210, comprising, for example, a general purpose computer controller, which is provided with (for example) logic to control oscillation of ferrofluid drop 151, and thus, oscillation of liquid drop 120 of liquid-liquid lens structure 100, as well as the capture of one or more in-focus images via an image sensor 220. Note that in this example, two electromagnetic drives 155, 155' are employed in alignment above and below ferrofluid drop 151 to control the motion of the ferrofluid drop by producing sequential pull-forces on the coupled droplets, causing either the top side volume to become larger or the bottom side volume to become larger, as explained above. This in turn alters the protruding volume of the lens drop into the first chamber portion 131 or second chamber portion 132. By so displacing the lens drop 120, the radii of curvature of the coupled droplets are manipulated, which in turn alters the focal distance of an object 230. By placing image sensor 220 on one side of the liquid lens, and optional optical components 225 on the other side, objects 230 at various distances can be focused upon.

Note that by way of example, image sensor 220 is disposed above enclosure 140, which in one embodiment, is a transparent housing (or enclosure), and is aligned with an image path passing through liquid drop 120, and in particular, passing through the first oscillating droplet portion 121 and second droplet portion 122 of liquid drop 120. In addition, the image path passes through enclosure 140, and any additional optical components 225 (such as a large aperture lens), which may optimally be employed with the oscillating liquid lens described herein. The resultant imaging system has a focal distance within a defined range, wherein objects located within that range may be captured during scanning Note that the image sensor 220 may comprise any appropriate imaging device. In one example, the image sensor is part of a digital camera or video recorder.

As noted above, in an optical system with an oscillating focal distance such as depicted in FIG. 2, the task of focusing changes. Instead of manipulating the position of a lens of fixed shape, the timing of the image recording is to be synchronized with the oscillations of the lens, and pictures should be taken inside the time interval during which the system is in focus. Fast electronic timing can be readily implemented using today's high-speed cameras. The result is a significantly faster adaptive lens than is possible with the mechanical movements of existing optics.

Advantageously, the oscillating liquid lens described herein is faster than the period of oscillation. By driving the system at its resonance frequency, for example, the lens' interfaces remain spherical, and the amplitudes of the oscillations are maximized. The combination of oscillating-focal-length lenses, with high-speed cameras, also provides the capability of three-dimensional (3-D) imaging. For example, a microscope objective based on an oscillating lens is capable of fast-scanning at different depths inside a sample under investigation. A high-speed camera could acquire in a single lens oscillation period enough images to produce the 3-D image by deconvolution. Such a system could also acquire 3-D microscopy movies in a frame rate equal to the lens oscillation rate. As one example, the EX-F1 high-speed camera, marketed by Casio, could be employed with the oscillating liquid lens described herein.

The above-described liquid lens structure of FIGS. 1A-2 varies the distance an object is in focus on an image sensor, which is at a fixed location. However, magnification of the object is essentially unchanged during the focusing operation. The reason for this is that as one of the two surfaces which refract the light increases its curvature (and hence its magnification), the other surface is simultaneously decreasing its curvature (and therefore its magnification). This is analogous to oscillating a solid lens (e.g., a double-convex lens which has a positive focal length) back and forth, relative to a fixed object and an imaging plane (e.g., image sensor). The result is that the focus is varied, but the zoom is not.

Figure 3A:
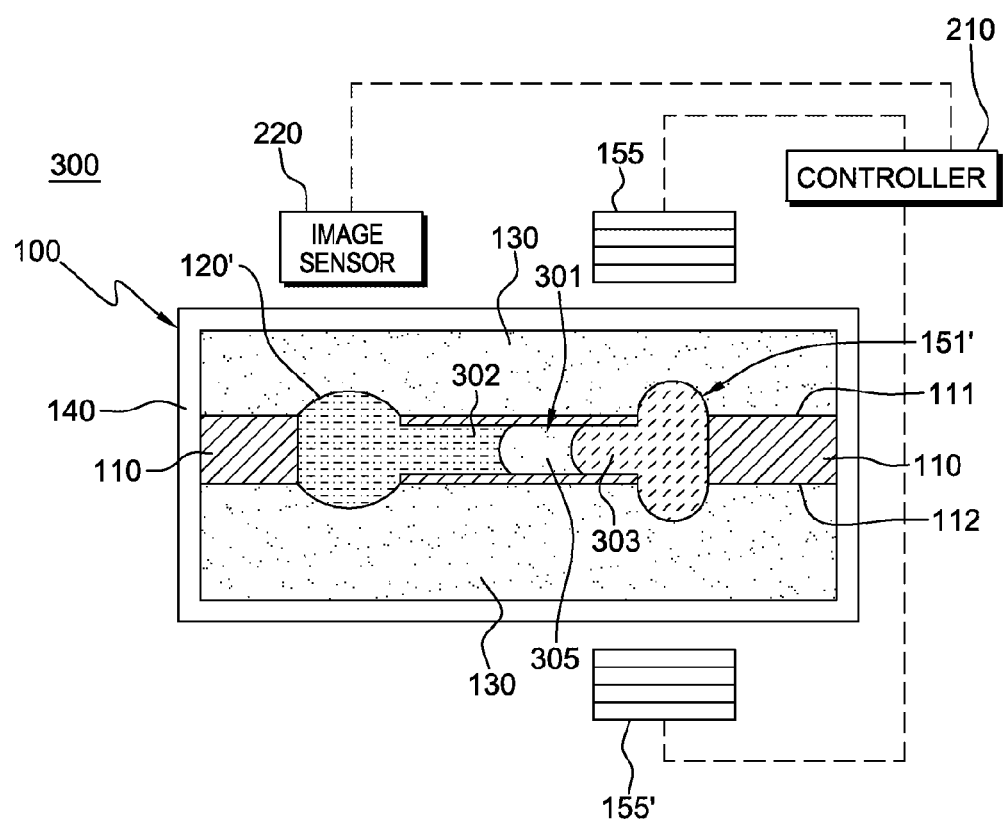
FIGS. 3A & 3B depict an alternate embodiment of an apparatus comprising an oscillating liquid-liquid lens with a lens magnification control, in accordance with one or more aspects of the present invention.
Figure 3B:
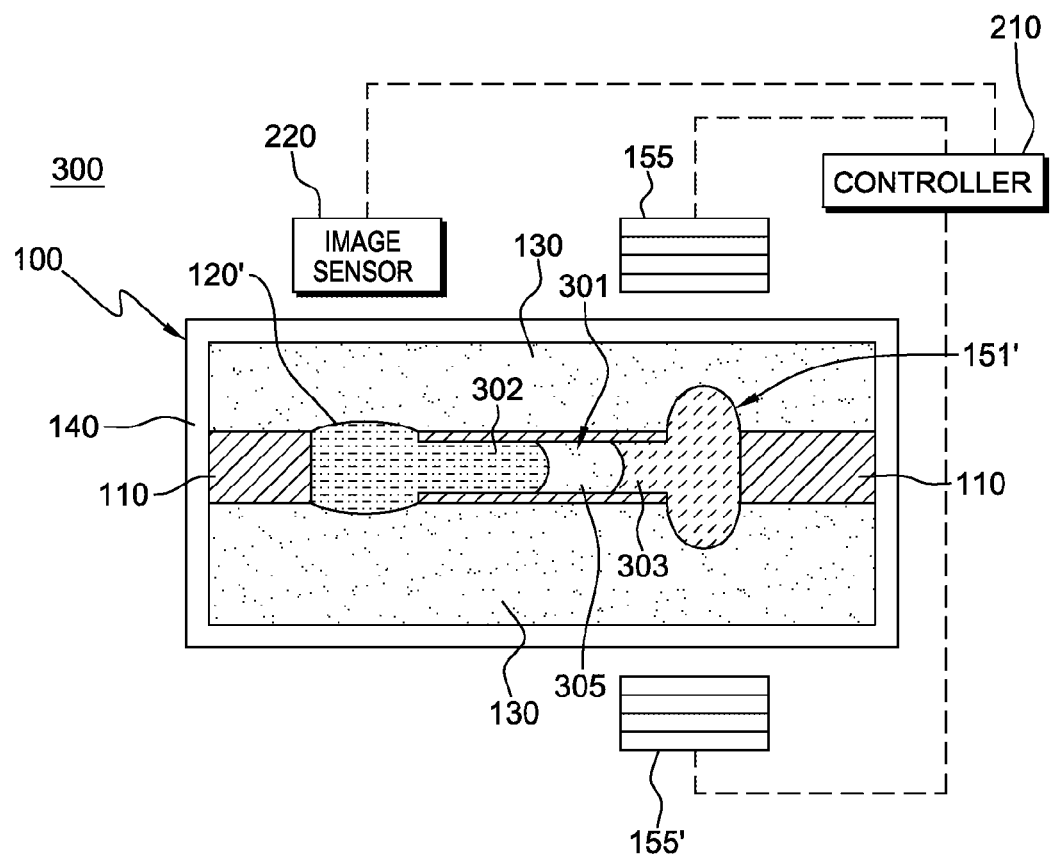

Therefore, disclosed herein with reference to FIGS. 3A & 3B is a liquid lens structure, generally denoted 300, where not only can focal distance be scanned in a manner such as described above, but lens magnification can also be varied. The structure provides for a true zoom lens, which is controllable electronically. In one implementation, the liquid lens structure 300 is analogous to liquid lens structure 200 described above in connection with FIG. 2, with the exception of a lens magnification control being provided in connection with liquid lens structure 300 for controllably adjusting magnification of the liquid lens.

Referring to FIG. 3A, an inner cavity 301 is provided within substrate 110 in fluid communication with the first channel holding the liquid drop 120'. As shown, an inner droplet portion 302 of liquid drop 120' extends towards or into inner cavity 301 of substrate 110. In the embodiment depicted, volume of inner droplet portion 302 extending towards or into inner cavity 301 is controlled via control of ferrofluid drop 151' held within a second channel through substrate 110, as explained above in connection with FIGS. 1A-2. As shown, inner cavity 301 is also in fluid communication with the second channel holding ferrofluid drop 151', and an inner droplet portion 303 of ferrofluid drop 151' extends into or towards inner cavity 301. In the embodiment illustrated, the inner droplet portion 302 of liquid drop 120' is separated by an interface liquid 305 from the inner droplet portion 303 of ferrofluid drop 151'. Interface liquid 305 may be a liquid which facilitates maintaining pinning of the inner droplet portion 302 of liquid drop 120', as well as pinning of the inner droplet portion 303 of ferrofluid drop 151', to the inner walls of substrate 110 defining inner cavity 301. In one example, the second liquid 130 is used as interface liquid 305, which is the liquid disposed within first chamber portion 131 and second chamber portion 132.

Advantageously, through the addition of the internal cavity connection between the liquid piston (ferrofluid drop 151') and the liquid drop 120', the total protruding volume of the liquid drop, comprising the instantaneous sum of the volume of the first and second droplet portions 121, 122, may be controlled, providing a direct means for varying liquid lens magnification. As noted, the magnetic control or liquid piston (ferrofluid drop 151') also determines distribution of the liquid drop between the two protruding sides, that is, controls oscillation of liquid drop 120' within the first channel of the substrate, and thus, configuration of the first droplet portion 121 and the second droplet portion 122, in a manner as described above in connection with FIGS. 1A-2, which facilitates control of focal distance of the lens. Advantageously, through a balancing of capillary forces and differential activation of the magnetic fields of the electromagnetic driver 155, 155', the total protruding volume (that is, the volume of the first droplet portion 121 plus the volume of second droplet portion 122) of the liquid drop can be controlled to control magnification simultaneously with oscillating of the liquid drop with the first chamber portion 131 and second chamber portion 132, which sets the focal distance, as described above.

Magnification control can be viewed by comparing the position of liquid lens 300 of FIG. 3A with that of FIG. 3B. As noted, magnification is varied by adjusting the total droplet volume of the liquid drop 120' protruding away from the first and second surfaces 111, 112, respectively, of substrate 110. In particular, the total protruding volume may be adjusted by adjusting the volume of inner droplet portion 302 of liquid drop 120' extending into or towards inner cavity 301. This can be achieved by a control of the total droplet volume of ferrofluid drop 151' protruding away from the first and second surfaces 111, 112 of substrate 110, and thus, the volume of inner droplet portion 303 of ferrofluid drop 151' protruding into or towards inner cavity 301. As noted, a layer of liquid, such as the immersion liquid (e.g., water) is provided between the liquid drop and the ferrofluid drop within the inner cavity to facilitate pinning of the respective inner droplet portions. By control of the ferrofluid drop, a relatively large magnification lens can be obtained, as depicted in FIG. 3A, or a smaller magnification lens can be obtained, as depicted in FIG. 3B. One consideration to note is the stiffness of the liquid connection (proportional to the radius of curvature) relative to the other interfaces may be tailored for the desired implementation.

Advantageously, magnification of the liquid lens can be simultaneously controlled with oscillation of the liquid lens, for instance, to control focal distance. As noted, this is achieved, in one embodiment, by the addition of an internal connection within the substrate between the liquid drop of the liquid lens and the ferrofluid driver, with the total protruding volume of the liquid drop being adjusted or controlled in order to set magnification of the liquid lens. In practice, this can be accomplished, for instance, via a DC shift in the signal to the electromagnetic drivers 155, 155' controlling the ferrofluid liquid piston. The task of focal distance control still lies with the oscilliatory motion of the liquid piston via the harmonic (AC) signal, which should be 90° out-of-phase for the two coils (rectified sign waves). The fact that ferrofluids always produce an attractive force regardless of coil polarity is fundamental, and essentially a consequence of the magnetic body force being proportional to the gradient of the square of the magnetic field.

Note that the magnification control disclosed herein utilizes, in one embodiment, a layer of liquid (such as the second liquid 130) as the interface within the internal connection between the inner droplet portion of the liquid drop and the inner droplet portion of the ferrofluid drop. By maintaining the same surface chemistries, it is possible to maintain contact lines pinned within the inner cavity as well. By way of specific example, the liquid drop may comprise 1-methylnaphtalene, the immersion (or second) liquid water, and the ferrofluid may be oil-based, and the substrate an anodized aluminum (e.g., $Al_2O_3$). This particular combination is effective as an electromagnetically-controlled, fast-focusing liquid lens structure. The ratios of the indices and refraction for the lens liquid (1-methylnaphtalene) in water is 1.61/1.33=1.21, which makes for an effective lens, not far from the power of a water lens in air. The other important requirement for the liquid lens is that it exhibit relatively large interfacial tension against the surrounding liquid. In the case of 1-methylnaphatalene against water, the interfacial tension is 34 dynes/cm, which is a substantial value, representing nearly 50% of the surface tension of water. The other requirement for the lens liquid selection is low viscosity. 1-methylnaphtalene has a dynamic viscosity of 2.98 cP, or about 3.1 times the viscosity of water, and is considered a low-viscosity liquid. Further, it is nearly density-matched, 1.02 specific gravity.

Figure 3C:
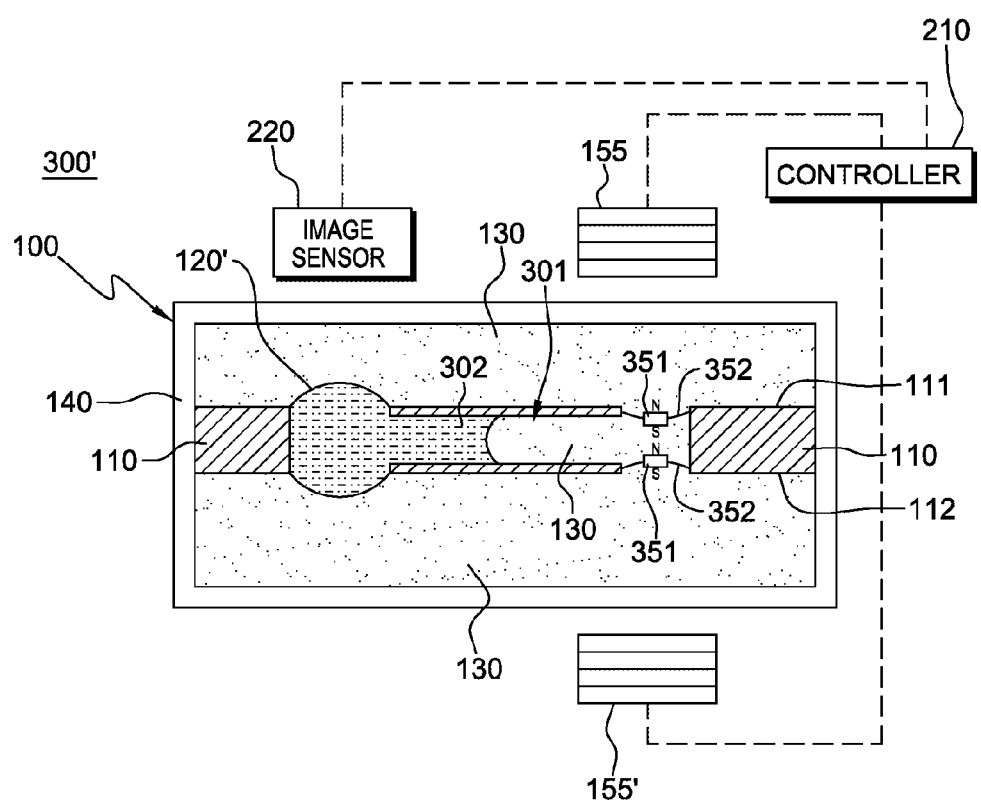
FIGS. 3C & 3D depict a further embodiment of an apparatus comprising an oscillating, liquid-liquid lens with a lens magnification control, in accordance with one or more aspects of the present invention.
Figure 3D:
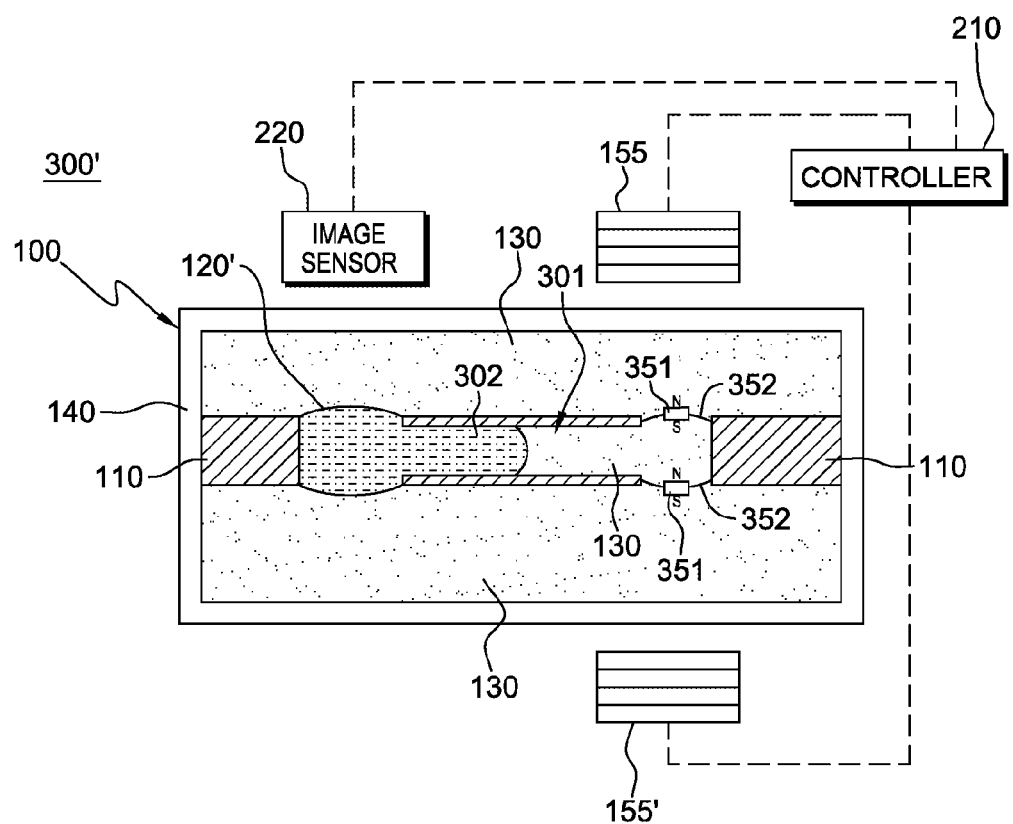

Note that the actuation mechanism of FIGS. 3A & 3B may be generalized. For instance, permanent magnets could be employed in a magnetic actuation mechanism, or in another approach, piezoelectric activation of membranes could be employed. FIGS. 3C & 3D depict one embodiment of a permanent magnet actuation mechanism.

The liquid lens structure 300' of FIGS. 3C & 3D is substantially identical to that described above in connection with FIGS. 3A & 3B, with the exception that the ferrofluid drop 151' of liquid lens structure 300 is replaced in the embodiment of FIGS. 3C & 3D with a permanent magnet actuation mechanism, which includes upper and lower permanent magnets 351 suspended within or on a flexible or elastic membrane 352 extending across appropriately-sized openings in substrate 110. These openings (or second channels) extend from first surface 111 to inner cavity 301, and second surface 112 to inner cavity 301, as shown. In this embodiment, inner cavity 301 may be filled with the second fluid 130, which also fills the first and second chamber portions 131, 132.

In the depicted example, magnification is again controlled via controller 210 and electromagnetic drivers 155, 155'. In particular, the electromagnetic drivers 155, 155' are controlled such that the total protruding volume of liquid drop 120' can be adjusted via selective control of the positioning of the permanent magnets 351 suspended by the elastic membranes 352. For instance, as shown in FIG. 3C, the total droplet volume of liquid drop 120' protruding from first and second surfaces 111, 112 of substrate 110 may be increased by applying opposing magnetic fields by each of the electromagnetic drivers 155, 155', and decreased (as shown in FIG. 3D) by applying attracting magnetic field (via each of the electromagnets 155, 155') to the respective permanent magnets 351. Thus, the permanent magnet actuation mechanism illustrated in FIGS. 3C & 3D may similarly determine distribution of the liquid drop between the two protruding sides, that is, controls oscillation of liquid drop 120' within the first channel of the substrate, and thus configuration of the first droplet portion 121 and second droplet portion 122, in a manner such as described above in connection with FIGS. 1A-3B, which facilitates control of focal distance of the lens, as described herein. However, the addition of the internal cavity connection between the permanent magnet actuation mechanism and the liquid drop 120', via the inner protruding portion 302 within inner cavity 301, facilitates control of the total protruding volume of the liquid drop, comprising the instantaneous sum of the volumes of the first and second droplet portions 121, 122, which provides a direct means for varying liquid lens magnification. Advantageously, through differential activation of the magnetic fields of the electromagnetic drivers 155, 155', the total protruding volume (that is, the volume of the first droplet portion 121 plus the volume of the second droplet portion 122 of the liquid drop) can be controlled to control magnification simultaneous with oscillation of the liquid drop within the first chamber portion 131 and second chamber portion 132, which sets the focal distance, as described above. For instance, this can be accomplished via a DC shift in the signal to the electromagnetic drivers 155, 155' controlling the permanent magnet positions. Since the permanent magnets allow repulsive force and not just attractive force, as is the case for the above-described ferrofluid embodiment, the signal to the two electromagnetic coils need not be 90° out-of-phase.

Figure 4:
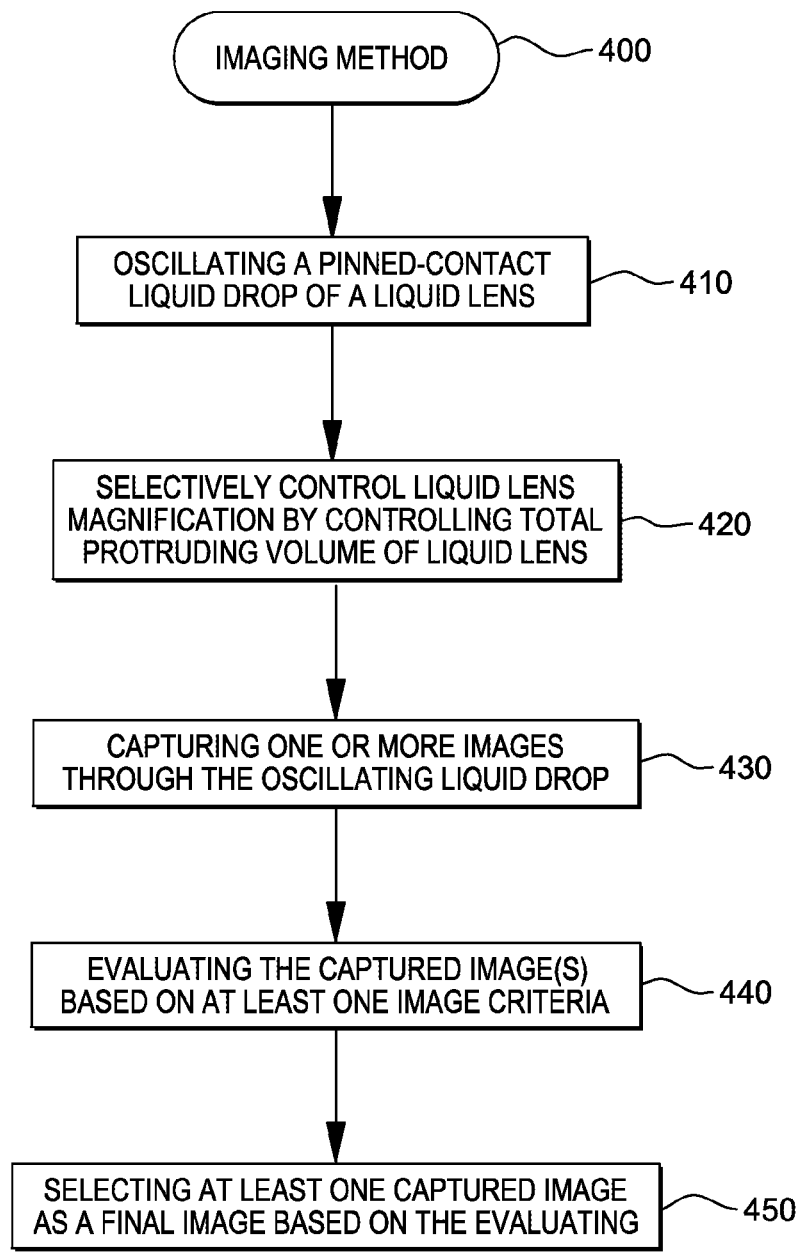
FIG. 4 is a flowchart of one embodiment of an imaging method employing an oscillating liquid-liquid lens with lens magnification control, such as depicted in FIGS. 3A & 3B, in accordance with one or more aspects of the present invention.

FIG. 4 illustrates one embodiment of an imaging method employing an oscillating liquid lens, such as described herein. The imaging method 400 includes oscillating a pinned-contact liquid drop of a liquid-liquid lens such as described herein 410, and while oscillating the liquid-liquid lens, or not, liquid lens magnification may be selectively controlled by controlling total volume of a liquid drop protruding into the liquid-liquid lens chamber 420. Concurrent with oscillating the liquid-liquid lens, one or more images may be captured through the oscillating liquid drop 430. Specifically, the one or more images are captured through the first droplet portion and second droplet portion of the drop, which extend above the first and second surfaces, respectively, of the substrate defining the channel within which the liquid drop resides. The captured images are forwarded to a controller, which comprises (in one embodiment) a computer that includes logic to evaluate 440 the captured images based on one or more image criteria, such as sharpness of the image. Evaluation of digital images can be readily accomplished by one skilled in the art using, in part, existing image analysis software. One or more captured image(s) is then selected as one or more final image(s) based on the evaluating 450. Depending upon the implementation, the final images may be combined into a 3-D representation of an object.

With reference to FIGS. 5A-8, various reconfigurable, non-oscillating liquid lens structures are also presented, each with an actuator (or driver) for adjusting configuration of a liquid lens drop, and thus a focal distance of the reconfigurable, non-oscillating liquid lens. The reconfigurable, non-oscillating liquid lens structures disclosed herein are stable (or static) once configured, and are ideal for lower-power applications and those requiring long exposure time, such as low-light imaging. As explained further below, in certain embodiments, once a new lens configuration is achieved (i.e., a desired focal distance is obtained), no further energy or power input is needed to maintain or hold that liquid lens configuration. In combination with such non-oscillating liquid lens structures, a lens magnification control is also advantageously presented.

Disclosed in this further aspect are liquid-liquid lens structures and imaging systems and methods employing the same, which advantageously achieve stable centimeter-scale apertures, orientation independence, and long-term stability. The liquid-liquid lens is again formed by coupling two droplets of a first, high-index of refraction liquid through a first channel (for example, a circular hole) in a substrate, such as a plate, and providing a second liquid with low-index of refraction, such as water, surrounding the plate and liquid lens, with the lens system being enclosed by an enclosure (such as a transparent acrylic box). Note, in one example, the ratio of index of refraction of the lens drop (e.g., 1-methylnaphthalene, with index of refraction of 1.615) and index of refraction of the surrounding liquid (e.g., water, with index of refraction of 1.33) is 1.21, which is significantly larger than unity and approaches that of air/water lens with ratio of indices of refraction of 1.33. The first liquid and the second liquid are chosen to be immiscible. By matching density of the first liquid droplets ($\rho_D$) with that of the surrounding liquid, such as water ($\rho_W$), the capillary length (scales with $(\rho_D - \rho_W)^{-1/2}$) can be increased from millimeters (for a typical liquid in gas liquid lens, such as a water lens in air) to centimeters.

To effect change in the curvature of the droplet (that is, to achieve a focal distance change) it is desirable to actuate the enclosed lens system in a non-invasive manner. To this end, an actuator is provided comprising, in one embodiment, one or more second channels (or openings) in the substrate, each of which accommodates and holds a ferrofluid drop comprising two coupled ferrofluid droplets. With one or more relatively small electromagnetic drivers placed (for example) outside of the enclosure, the ferrofluid drop(s) can be reconfigured, which in turn results in reconfiguration of the liquid lens drop as the ferrofluid droplets reconfigure (i.e., displace liquid) within the fixed volumes of first and second chamber portions on either side of the substrate filled with the incompressible second liquid.

In one embodiment, two electromagnets are aligned, one above and one below the at least one ferrofluid drop, to facilitate reconfiguration and holding of the at least one ferrofluid drop in, for example, an asymmetrical configuration, and thus, reconfiguring and maintaining stable (or static) the liquid lens drop. In another embodiment described herein, multiple ferrofluid drops may be held in multiple second channels (or openings) in the substrate. Each ferrofluid drop of the multiple ferrofluid drops is sized adequately large for its channel (or opening) so as to function as a bi-stable capillary switching element, which allows the non-oscillating liquid lens to be controllably reconfigured, for example, by applying a DC pulse to one or more electromagnet drivers associated with the multiple ferrofluid drops to transition the state of one or more of the bi-stable ferrofluid switching elements.

Figure 5A:
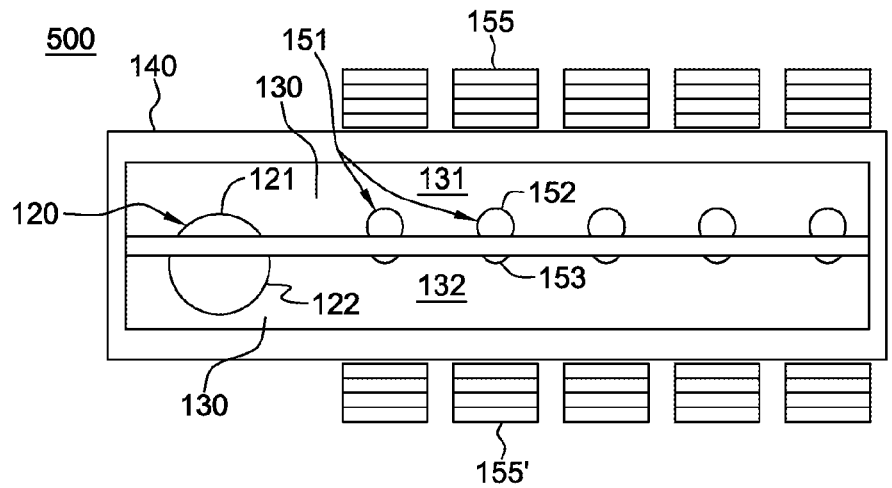
FIG. 5A is an elevational view of another embodiment of an apparatus comprising a reconfigurable liquid lens structure, in accordance with one or more aspects of the present invention.
Figure 5B:
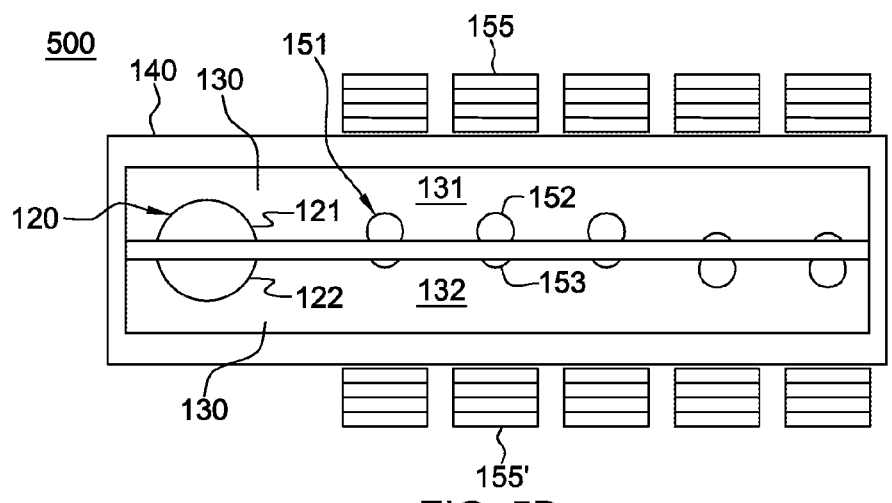
FIG. 5B depicts the reconfigurable liquid lens structure of FIG. 5A, shown with two of the five illustrated bi-stable capillary switching elements switched from the first (upper) chamber portion to the second (lower) chamber portion of the reconfigurable liquid lens, and illustrating the resultant reconfiguration of the liquid lens drop, in accordance with one or more aspects of the present invention.
Figure 5C:
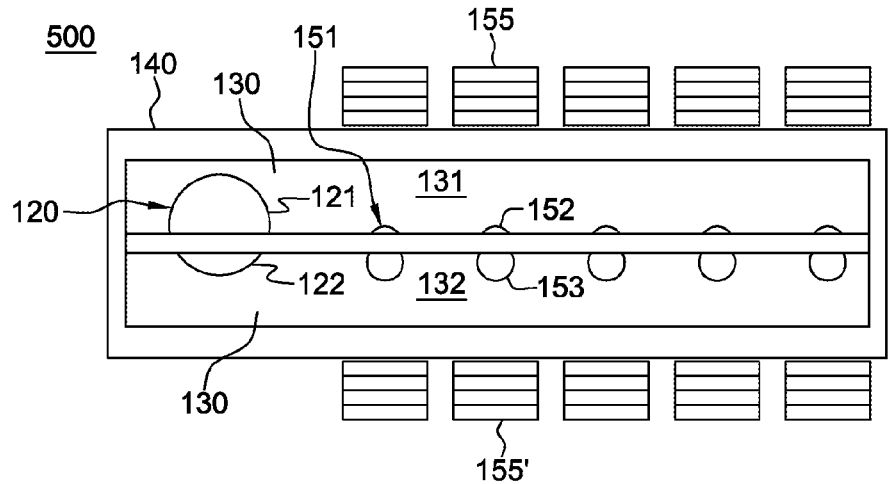
FIG. 5C depicts the reconfigurable liquid lens structure of FIGS. 5A & 5B, shown with the remaining bi-stable capillary switching elements switched to the second (lower) chamber portion of the reconfigurable liquid lens, and illustrating the resultant reconfiguration of the liquid lens drop, in accordance with one or more aspects of the present invention.

FIGS. 5A-5C depict one embodiment of such a non-oscillating liquid lens structure 500, which is similar, in part, to the oscillating liquid-liquid lens structure described above in connection with FIGS. 1A-2, but with multiple ferrofluid drops 151, each configured with sufficient ferrofluid volume to function as a bi-stable capillary switch element. As illustrated, each ferrofluid drop 151 is driven, in this embodiment, by a respective electromagnet pair 155, 155' disposed above and below the ferrofluid drop, and each ferrofluid drop 151 is provided with a total volume greater than the critical volume in relation to the respective channel (or opening) within which the drop is held. This in turn means that each ferrofluid drop functions as a bi-stable capillary switch element, and may be switched between one of two states; that is, either an upper state or a lower state, wherein in the upper state, greater ferrofluid volume exists within the first chamber portion 131 of the liquid lens structure, and in the lower state, greater ferrofluid volume resides within the second chamber portion 132 of the liquid lens structure 500.

Movement of ferrofluid within the ferrofluid drops between the upper and lower states correspondingly affects and controls the proportion of the first fluid in the first and second droplet portions 121, 122 of liquid lens drop 120 above and below substrate 110. By selectively activating one or more ferrofluid drops to switch the ferrofluid drop from, for example, an upper state, such as illustrated in FIG. 5A, to a lower state, such as illustrated in FIG. 5C, reconfiguration of the liquid lens drop is achieved. This is due, in part, to the incompressible nature of the second fluid (e.g., water) contained within the chamber comprising upper chamber portion 131 and lower chamber portion 132. The electromagnets 155, 155' may be selectively energized to adjust configuration of the respective ferrofluid drops 151, or more particularly (in this example) to switch the ferrofluid drops between the upper and lower states. Providing ferrofluid drops with a volume sufficient to function as a bi-stable capillary switch element provides the further advantage of eliminating the need to maintain energizing of the respective electromagnetic drivers once the state is switched to achieve the desired configuration of the liquid lens drop.

As noted, by way of example, FIG. 5A depicts all of the switching elements in the upper state, and in FIG. 5B, two of the switching elements have been switched down to the lower state (by activating the respective electromagnets 155'). In FIG. 5C, all of the switching elements have been toggled down (by energizing the respective electromagnets 155'). The result depicted in FIG. 5C is that a maximum volume of the first liquid of the liquid lens drop resides in first chamber portion 131 of the enclosure, and a minimum first liquid volume resides in second chamber portion 132, which provides the shortest focal distance of the lens.

Figure 6A:
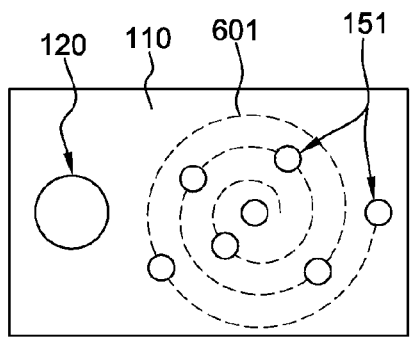
FIG. 6A is a partial plan view of another embodiment of an apparatus comprising a reconfigurable liquid lens structure, in accordance with one or more aspects of the present invention.
Figure 6B:
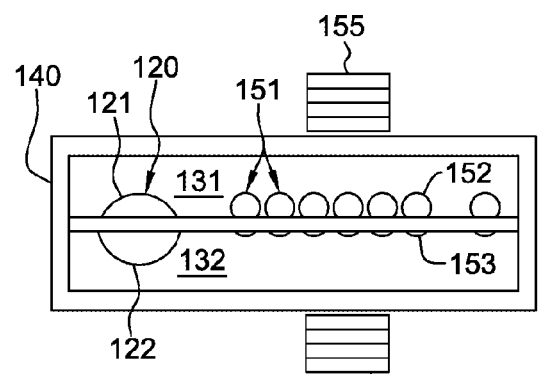
FIG. 6B is an elevational view of the reconfigurable liquid lens structure of FIG. 6A, in accordance with one or more aspects of the present invention.
Figure 6C:
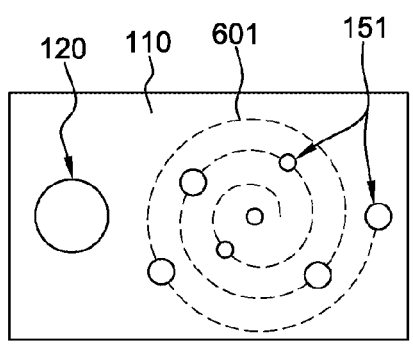
FIGS. 6C & 6D depict the reconfigurable liquid lens structure of FIGS. 6A & 6B, with three of the illustrated bi-stable capillary switching elements shown transitioned from the first (upper) chamber portion to the second (lower) chamber portion, and with the resultant reconfiguration of the liquid lens drop illustrated in FIG. 6D, in accordance with one or more aspects of the present invention.
Figure 6D:
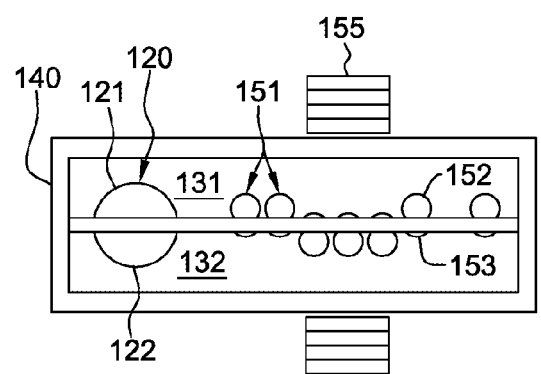
Figure 6E:
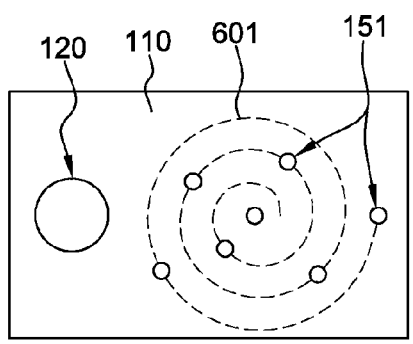
FIGS. 6E & 6F depict the reconfigurable liquid lens structure of FIGS. 6C & 6D, with the remaining bi-stable capillary switching elements shown transitioned from the first (upper) chamber portion to the second (lower) chamber portion, and with the resultant configuration of the liquid lens drop illustrated in FIG. 6F, in accordance with one or more aspects of the present invention.
Figure 6F:
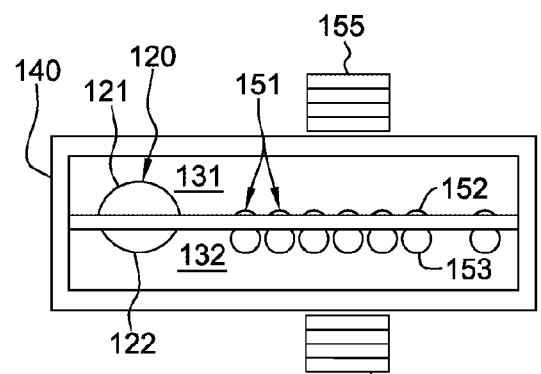

By way of further example, FIGS. 6A-6F illustrate one embodiment of another reconfigurable liquid lens structure, as well as the toggling of the illustrated bi-stable ferrofluid switch elements. In this embodiment, multiple ferrofluid drops 151 are employed, each with a ferrofluid volume sufficient to function as a bi-stable capillary switch element. Each ferrofluid drop 151 comprises a pair of coupled ferrofluid droplets in a respective second channel. In this embodiment, a single pair of electromagnets 155, 155' is employed, along with strategic placement of the ferrofluid drops 151, such as in a spiral 601 configuration outward from the center axis of the aligned electromagnetic drives 155, 155'. In the operational example depicted in FIGS. 6A & 6B, the switch elements are all set to the upper state, meaning that the volume of the first liquid in the second droplet portion 122 of liquid lens drop 120 is at a maximum. As the lower electromagnet 155' is energized, the switch elements closest in distance to the center axis of the aligned electromagnets 155, 155' will initially switch to the lower state, as illustrated in FIGS. 6C & 6D, wherein a greater volume of ferrofluid is disposed in the second droplet portion 153, than in the first droplet portion 152. As the power to electromagnet 155' continues to increase (and no power is needed for electromagnet 155), all ferrofluid drops are toggled to the lower state, as illustrated in FIGS. 6E & 6F. Advantageously, after one or more of the ferrofluid drops are toggled, the electromagnetic drivers 155, 155' may be de-energized, and the liquid lens drop will retain the desired shape, due to the bi-stable nature of the ferrofluid drops described in this embodiment.

The above-described liquid lens structures of FIGS. 5A-6F vary the distance an object is in focus on an image sensor, which is at a fixed location. However, magnification of the object is essentially unchanged during the focusing operation. The reason for this is that as one of the two surfaces which refract the light increases its curvature (and hence its magnification), the other surface is simultaneously decreasing its curvature (and therefore its magnification).

Figure 7:
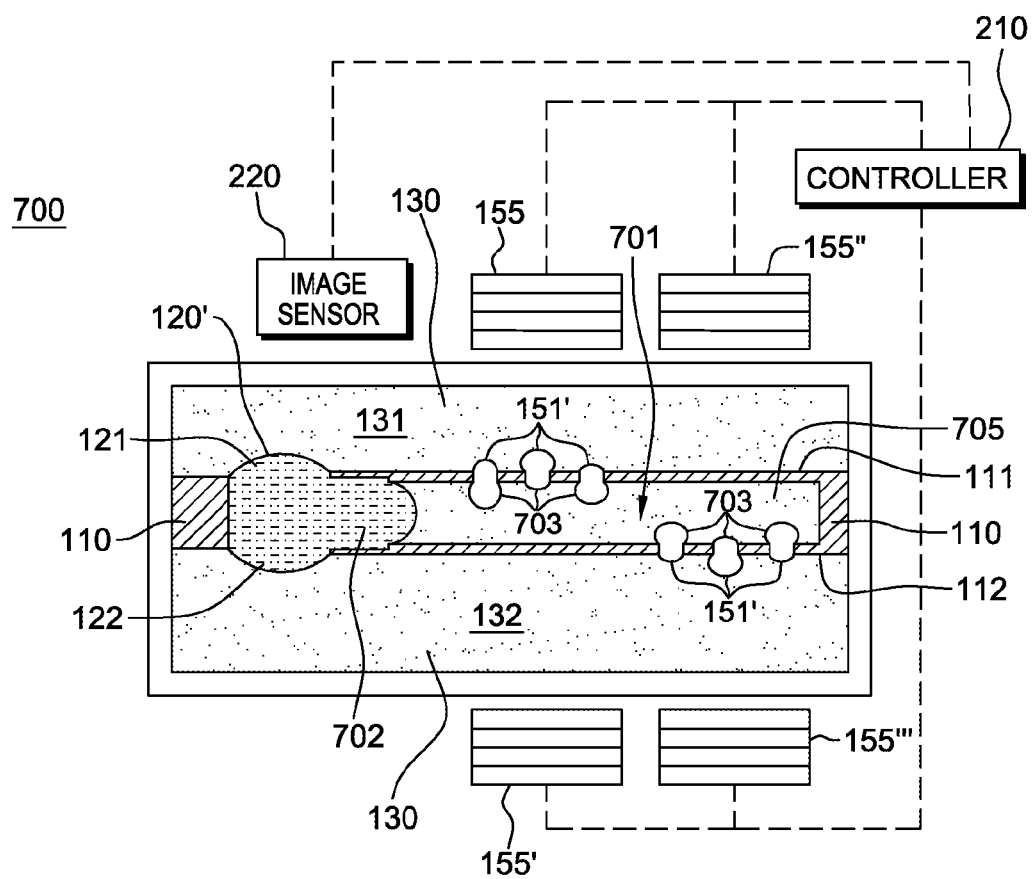
FIG. 7 depicts another embodiment of an apparatus comprising a reconfigurable liquid lens structure with lens magnification control, in accordance with one or more aspects of the present invention.

FIG. 7 depicts a variation on the non-oscillating liquid lens structures of FIGS. 5A-6F, where both focal distance and magnification can be varied or controlled. In one embodiment, the reconfigurable, non-oscillating liquid lens structure 700 of FIG. 7 is similar to the non-oscillating liquid lens structure of FIGS. 6A-6F, however, with certain modifications described below to provide a lens magnification control for adjusting magnification of the liquid lens drop by increasing or decreasing the total droplet volume of the liquid drop protruding away from the first and second surfaces of the substrate.

As shown in FIG. 7, an inner cavity 701 is provided within substrate 110 in fluid communication with the first channel holding the liquid drop 120'. An inner droplet portion 702 of liquid drop 120' extends towards or into inner cavity 701 of substrate 110. Volume of this inner droplet portion 702 is controlled via control of one or more ferrofluid drops 151' held within respective second channels in substrate 110 extending from first surface 111 or second surface 112 of substrate 110 to inner cavity 701. As illustrated in FIG. 7, the ferrofluid drops 151' each comprise an inner droplet portion 703 within inner cavity 701, with the remainder of cavity 701 being filled with an interface liquid 705, such as the second liquid 130 filling first and second chamber portions 131, 132. In this configuration, multiple pairs of electromagnets 155, 155', and 155'', 155''', are provided for separate control of multiple upper ferrofluid drops 151' and multiple lower ferrofluid drops 151', as illustrated. By toggling a desired number of switches (ferrofluid drops), the proportion of the liquid lens drop in the first and second droplet portions 121, 122 can be controlled, thus setting the focal distance of the liquid drop in a manner similar to that described above in connection with FIGS. 5A-6F.

As noted, the liquid lens concept is also extended herein to utilize the multiple ferrofluid drops 151' to control the total droplet volume of the first and second droplet portions 121, 122 protruding away from the first and second surfaces 111, 112 of substrate 110. By doing so, magnification of the liquid lens may be controlled or adjusted by, for instance, controller 210. For instance, if the same number of ferrofluid drops or switches in the upper row are toggled up (that is, into the first chamber portion 131) as the number of ferrofluid drops or switches in the bottom row are toggled up into the inner cavity 701, then the focal distance is varied. If, on the other hand, the number of ferrofluid drops or switches toggled in the upper and lower rows differ, then magnification is varied via control of the volume of inner droplet portion 702 protruding into or towards inner cavity 701, and thus, the total droplet volume protruding away from the first and second surfaces in the first and second droplet portions 121, 122 of the liquid drop 120'. Toggling of ferrofluid drops 151' may be achieved by applying a brief DC pulse using the respective pair of electromagnetic drivers. Note that the upper ferromagnetic drops may be distributed in a spiral pattern so that they can be toggled with a single pair of opposing electromagnetic drivers 155, 155', in a manner described above. Similarly, a spiral distribution of ferrofluid drops in the lower row of ferrofluid drops or switches may also be employed to be controlled by a separate pair of electromagnets 155", 155"', as illustrated.

As in the embodiment described above in connection with FIGS. 3C & 3D, alternate activation mechanisms may be employed within a liquid lens structure 700 such as depicted in FIG. 7. These alternate activation mechanisms could include, for instance, permanent magnets supported by respective elastic membranes extending across respective second channels. Note further that other activation mechanisms are possible without departing from the scope of the present invention. For instance, piezoelectric activation of respective membranes could be employed to controllably adjust magnification of the liquid lens.

Figure 8:
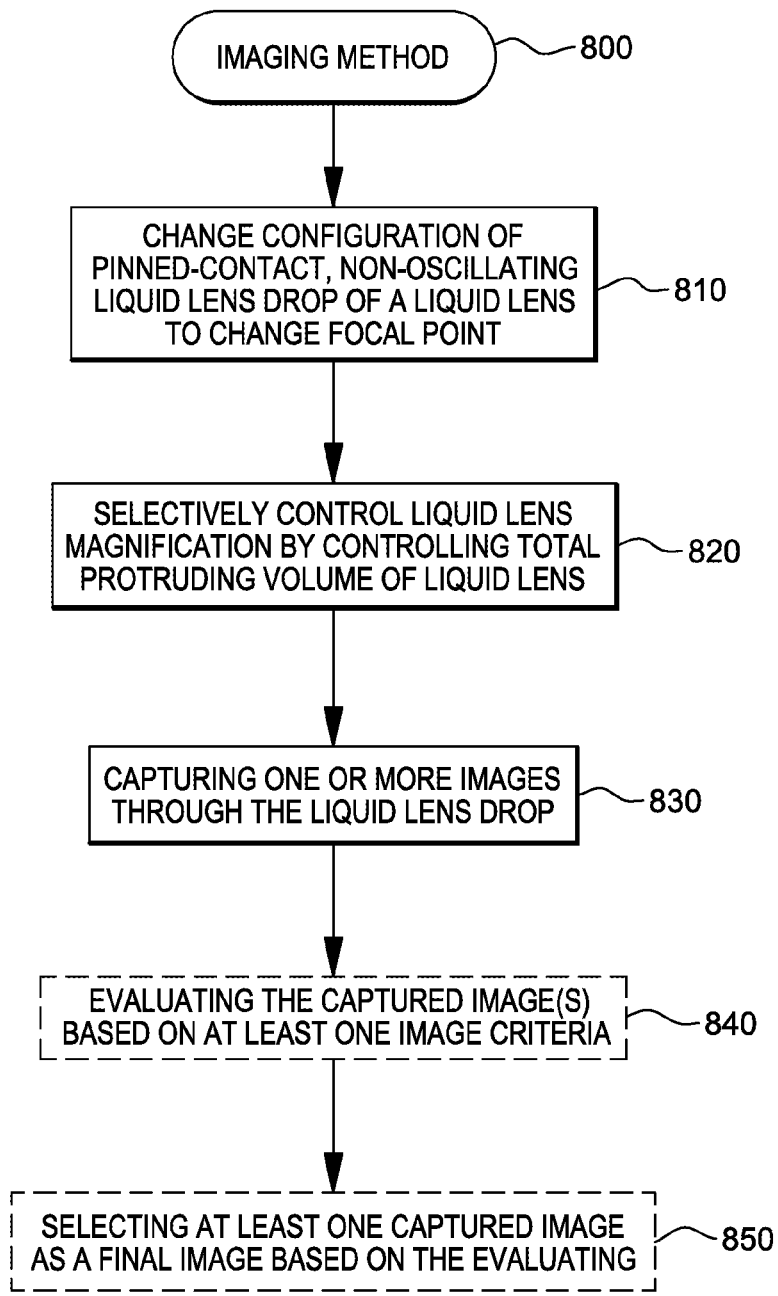
FIG. 8 is a flowchart of one embodiment of an imaging method employing a reconfigurable liquid lens structure with lens magnification control, such as depicted in FIG. 7, in accordance with an aspect of the present invention.

FIG. 8 illustrates one embodiment of an imaging method employing an oscillating liquid lens, such as described herein. The imaging method 800 includes non-oscillatingly adjusting configuration of a pinned-contact liquid lens drop of a liquid-liquid lens 810 to adjust focal distance, and if desired, liquid lens magnification may be selectively controlled by controlling total volume of the liquid drop protruding into the liquid-liquid lens chamber 820. One or more images may be captured through the liquid lens drop 830. Specifically, the one or more images are captured through the first droplet portion and second droplet portion of the lens drop, which extend above the first and second surfaces, respectively, of the substrate comprising the channel within which the liquid lens drop is held. The captured images may optionally be forwarded to a controller, which comprises (in one embodiment) a computer that includes logic to evaluate 840 the captured images based on one or more image criteria, such as sharpness of the image. Evaluation of digital images can be readily accomplished by one skilled in the art using, in part, existing image analysis software. One or more captured image(s) may then be selected as one or more final image(s) based on the evaluating 850. Depending upon the implementation, the final images may be combined.

Note that in the embodiments described herein with reference to FIGS. 1A-8, the liquid drop is assumed to comprise a higher index of refraction substance than the surrounding immersion liquid, that is, the second liquid within the first and second chamber portions. In another embodiment, the liquid drop could be a smaller index of refraction substance immersed within a liquid comprising a higher index of refraction substance. For instance, in one embodiment, the above-noted liquid drop and second liquid substances examples could be reversed. In such a case, a positive focal length lens could be produced to carry out the task of focusing light in order to make an image by having a negative meniscus in the liquid drop or liquid lens, with the smaller index of refraction substance surrounded by or immersed within the second liquid of larger index of refraction.

Further, a negative meniscus in a liquid lens with a larger index of refraction surrounded by a second liquid of smaller index of refraction can be employed to produce a lens with negative focal length, which is also of utility in imaging and other optic applications.

To address these possibilities, the claims appended herewith discuss a first interface and a second interface between the liquid drop comprising the first liquid, and the second liquid disposed within the chamber. The first interface defines a first protruding liquid portion relative to the first surface of the substrate, and the second interface defines a second protruding liquid portion relative to the second surface of the substrate. Taken together, the first and second protruding liquid portions define a total protruding liquid volume, and it is this volume which is either increased or decreased by the lens magnification control presented herein in order to control magnification of the liquid lens. Note that the first and second interfaces may comprise positive meniscus interfaces, negative meniscus interfaces, or a combination thereof, depending upon the implementation. In a positive meniscus implementation, the protruding liquid portion comprises a portion of the liquid drop—such as in the above-described examples; while in a negative meniscus implementation, the protruding liquid portion comprises a portion of the immersion liquid, that is, the second liquid protruding into the one channel containing the liquid drop.

In summary, those skilled in the art will note from the above discussion of FIGS. 1A-4 that the pinned-contact, oscillating liquid-liquid lens described herein, in one aspect, provides a novel solution for imaging systems where fast changes in focal distance are sought. The liquid lens can be manufactured in a small and lightweight package, with a non-invasive, oscillation driving approach, as described herein. Advantageously, relatively small voltage levels can be employed in the activation mechanism, making application of the liquid-liquid lens practical.

Disclosed herein, in this first aspect, is a liquid-liquid lens with an oscillating focal distance that can capture any image plane in a given range of the oscillations. The lens features two droplet portions coupled through a cylindrical channel (or hole), with pinned-contact lines against a non-wetting substrate. An incompressible second liquid surrounds the liquid lens in a closed chamber. A non-invasive electromagnetic drive may be employed to oscillate coupled ferrofluid droplets in a second cylindrical channel (or hole) in the substrate. Oscillation of the ferrofluid droplets results in corresponding oscillation of the liquid lens droplets via the incompressible surrounding liquid. The change in the curvature of the droplet portions induces a change in focal distance. The opposing curvature of the droplets creates a spring-like force that makes the system a natural oscillator. As image capture timing is electronic, it can be achieved rapidly, so that the frequency response of the lens is only limited by the system's resonant frequency. The liquid lens presented is a coupled-droplet system, which can be made to oscillate at resonance with very little input. When the oscillation is fast enough, the lens can be thought of as always being very close in time to being at the desired focal distance; hence, the idea of fast-focusing behind the liquid-liquid lens presented.

Those skilled in the art will also note from the discussion of FIGS. 5A-8 that, in another aspect, the pinned-contact, reconfigurable, non-oscillating liquid-liquid lens described herein presents a novel solution for imaging systems where changes in focal distance are sought. The liquid lens can again be manufactured in a small and lightweight package, with a non-invasive, actuation approach, as described herein. Advantageously, relatively small voltage levels can be employed in the reconfiguration mechanism, making application of the liquid lens practical.

In this aspect, a liquid lens is disclosed with an adaptable focal distance that, through reconfiguration, can capture any image plane in a given range. The lens features two droplet portions coupled through a cylindrical channel (or hole), with pinned-contact lines residing against a non-wetting substrate. An incompressible second liquid surrounds the liquid lens in a closed chamber. A non-invasive electromagnetic drive is employed (in one embodiment) to adjust coupled ferrofluid droplets in a second cylindrical channel (or hole) in the substrate. Adjusting of the ferrofluid droplets results in corresponding reconfiguration of the liquid lens droplets via the incompressible surrounding liquid. The change in the curvature of the droplet portions induces a change in focal distances. The liquid lens presented is a coupled-droplet system, which can be reconfigured with very little input.

Advantageously, lens magnification control is provided herein in combination with the liquid-liquid lens with oscillating focal distance, as well as the reconfigurable, non-oscillating liquid-liquid lens embodiments. In both implementations, the magnification control provides a mechanism to controllably adjust total droplet volume of the liquid drop (i.e., the liquid lens drop) protruding away from the first and second surfaces of the substrate to which the liquid drop is pinned. This can be achieved by providing an inner cavity within the substrate in fluid communication with both the channel holding the liquid drop, and the channel holding the ferrofluid drop, with both the liquid drop and the ferrofluid drop having inner droplet portions which protrude from the respective channel towards or into the inner cavity. These inner droplet portions may be, in one embodiment, in indirect contact by providing an interface liquid, such as the immersion liquid within the inner cavity separating the two or more inner droplet portions. Magnification control using the structures presented can be accomplished via, for instance, appropriate programming of the controller to control the respective electromagnetic drivers.

The large aperture, adaptive liquid-liquid lens disclosed herein offers unique advantages and capabilities over existing approaches. Increased light gathering is possible with centimeter-scale aperture lenses (e.g., a 30-fold increase in light gathering capability going from a 1.68 mm diameter liquid lens in air to a 10 mm diameter liquid-liquid lens). Light gathering is further enhanced by re-configurability without oscillations, as compared to oscillatory-driven liquid lenses. Energy efficiency is retained, while long-term stability issues (e.g., due to evaporation) which have traditionally plagued previous liquid lens designs, have been eliminated, all in a design that is nearly invariant with gravitational orientation.

Those skilled in the art will note that the coupled-droplet systems presented herein can also be applied in a number of applications, including mobile phones, video recorders, and other small, lightweight consumer products with video recording capabilities. Other applications include high-speed adaptive imaging, camcorders, and other 3-D image reconstruction by arrays of lenses and re-configurability for less demanding applications, with an emphasis on energy consumption. For example, other applications include autonomous, micro-air-vehicles for surveillance and defense, which would benefit from imaging capabilities in many directions rather than just vision straight ahead (or below). The relatively small size and high energy efficiency of the liquid-liquid lens presented suits the installation of several of these lenses in such a small vehicle to realize imaging in all directions with rapid focusing capabilities.

As will be appreciated by one skilled in the art, aspects of the controller described above may be embodied as a system, method or computer program product. Accordingly, aspects of the controller may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the controller may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that certain blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, certain blocks in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that certain blocks of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

What is claimed is:

1. An apparatus comprising:
    a liquid lens comprising:
        a substrate comprising at least one channel extending through the substrate between a first surface and a second surface of the substrate;
        a liquid drop comprising a first liquid, the liquid drop being disposed, in part, within one channel of the at least one channel extending through the substrate;
        an enclosure at least partially surrounding the substrate and comprising a chamber, the one channel of the at least one channel extending through the substrate residing within the chamber of the enclosure;
        a second liquid disposed within the chamber, the second liquid and the liquid drop comprising the first liquid being in one of direct or indirect contact within the chamber at a first interface and a second interface, the first interface defining a first protruding liquid portion relative to the first surface of the substrate, and the second interface defining a second protruding liquid portion relative to the second surface of the substrate, and taken together, the first and second protruding liquid portions defining a total protruding liquid volume; and
        a lens magnification control for adjusting magnification of the liquid lens by increasing or decreasing the total protruding liquid volume defined relative to the first and second surfaces of the substrate.

2. The apparatus of claim 1, further comprising an actuator for non-oscillatingly adjusting configuration of the liquid drop to adjust a focal distance of the liquid lens, wherein both magnification of the liquid lens and focal distance of the liquid lens may be adjusted.

3. The apparatus of claim 2, wherein the actuator comprises multiple ferrofluid drops held in multiple second channels in the substrate extending between one of the first surface and the inner cavity, or the second surface and the inner cavity, each ferrofluid drop comprising a volume greater than a critical volume defined relative to a diameter of the respective second channel of the multiple second channels and functioning as a bi-stable capillary switching element, wherein each bi-stable capillary switching element can be toggled between a first state, where the ferrofluid drop resides principally within the chamber, and a second state, where the ferrofluid drop resides principally within the inner cavity of the substrate, and wherein one ferrofluid drop of the multiple ferrofluid drops is separably switchable from another ferrofluid drop of the multiple ferrofluid drops to facilitate tuning of the focal distance of the liquid lens, and wherein the lens magnification control comprises the actuator and adjusts magnification of the liquid lens by selectively switching the multiple ferrofluid drops to adjust the total protruding liquid volume relative to the first and second surfaces of the substrate.

4. The apparatus of claim 1, further comprising an actuator for oscillating the liquid drop within the one channel, the lens magnification control providing control of liquid lens magnification notwithstanding oscillation of the liquid drop within the one channel.

5. The apparatus of claim 4, further comprising at least one imaging sensor coupled to at least one imaging path passing through the liquid drop in the one channel for capturing an image through the liquid drop.

6. The apparatus of claim 4, wherein the lens magnification control comprises an inner cavity within the substrate in fluid communication with the one channel of the at least one channel extending through the substrate, the liquid drop further comprising an inner droplet portion protruding from the one channel towards the inner cavity, and wherein the lens magnification control controls the total protruding liquid volume relative to the first and second surfaces of the substrate by controlling volume of the inner droplet portion protruding from the one channel of the substrate towards the inner cavity.

7. The apparatus of claim 6, wherein the at least one channel in the substrate comprises at least one first channel, and the lens magnification control further comprises:
at least one deformable surface extending across at least one second channel in the substrate extending to the inner cavity;
an interface liquid disposed within the inner cavity, wherein the at least one deformable surface and the inner droplet portion of the liquid drop are in indirect contact via the interface liquid; and
a driver to controllably adjust position of the at least one deformable surface, and thereby control volume of the inner droplet portion of the liquid drop protruding towards the inner cavity, and thus the total protruding liquid volume relative to the first and second surfaces of the substrate, and wherein the actuator comprises the driver.

8. The apparatus of claim 6, wherein the first surface of the substrate facilitates defining a first chamber portion of the chamber, and the second surface of the substrate facilitates defining a second chamber portion of the chamber, and wherein the second liquid substantially fills the first chamber portion and the second chamber portion.

9. The apparatus of claim 8, wherein the second liquid and the liquid drop comprising the first liquid are immiscible and are in direct contact within the first chamber portion, and are in direct contact within the second chamber portion.

10. The apparatus of claim 6, wherein the at least one channel in the substrate comprises at least one first channel, and the lens magnification control further comprises:
at least one ferrofluid drop disposed, in part, within at least one second channel in the substrate, one ferrofluid drop of the at least one ferrofluid drop comprising an inner droplet portion extending into the inner cavity, the inner droplet portion of the liquid drop and the inner droplet portion of the one ferrofluid drop being in one of direct or indirect contact within the inner cavity; and
at least one electromagnetic driver to controllably adjust volume of the inner droplet portion of the one ferrofluid drop of the at least one ferrofluid droplet extending into the inner cavity, and thereby control volume of the inner droplet portion of the liquid drop protruding towards the inner cavity, and thus the total protruding liquid volume relative to the first and second surfaces of the substrate, and wherein the actuator comprises the at least one electromagnetic driver.

11. The apparatus of claim 10, wherein the inner droplet portion of the liquid drop and the inner droplet portion of the one ferrofluid drop are in indirect contact within the inner cavity via an interface liquid disposed within the inner cavity.

12. The apparatus of claim 11, wherein the interface liquid comprises the second liquid, the second liquid separating the inner droplet portion of the liquid drop and the inner droplet portion of the one ferrofluid drop within the inner cavity of the substrate.

13. A method of fabricating a liquid lens comprising:
obtaining a substrate, the substrate being non-wetting relative to a liquid drop;
providing at least one channel in the substrate extending from a first surface to a second surface thereof;
providing the liquid drop comprising a first liquid within one channel of the at least one channel extending through the substrate;
providing an enclosure at least partially surrounding the substrate and comprising a chamber, the one channel of the at least one channel extending through substrate residing within the chamber of the enclosure;
disposing a second liquid within the chamber, the second liquid and the liquid drop comprising the first liquid being in one of direct or indirect contact within the chamber at a first interface and a second interface, the first interface defining a first protruding liquid portion relative to the first surface of the substrate, and the second interface defining a second protruding liquid portion relative to the second surface of the substrate, and taken together, the first and second protruding liquid portions defining a total protruding liquid volume; and
providing a lens magnification control for adjusting magnification of the liquid lens by increasing or decreasing the total protruding liquid volume defined relative to the first and second surfaces of the substrate.

14. The method of claim 13, further comprising providing an actuator for non-oscillatingly adjusting configuration of the liquid drop to adjust a focal distance of the liquid lens, wherein both magnification of the liquid lens and focal distance of the liquid lens may be adjusted.

15. The method of claim 13, further comprising providing an actuator for oscillating the liquid drop within the channel, the lens magnification control providing control of liquid lens magnification notwithstanding oscillation of the liquid drop within the one channel.

16. The method of claim 15, wherein providing the lens magnification control comprises providing the substrate with an inner cavity in fluid communication with the one channel of the at least one channel extending through the substrate, the liquid drop further comprising an inner droplet portion protruding from the one channel towards the inner cavity, and wherein the lens magnification control controls the total protruding liquid volume defined relative to the first and second surfaces of the substrate by controlling volume of the inner droplet portion protruding from the one channel of the substrate towards the inner cavity.

17. The method of claim 15, further comprising providing at least one imaging sensor coupled to at least one imaging path passing through the first and second droplet portions of the liquid lens drop in the one channel for capturing an image through the first and second droplet portions of the liquid lens drop.

* * * * *